(12) United States Patent
Chapman et al.

(10) Patent No.: US 9,021,455 B2
(45) Date of Patent: Apr. 28, 2015

(54) PACKED DATA OBJECTS

(75) Inventors: Graham A. Chapman, Ontario (CA); Anderson Klegues Fraga, Ontario (CA); Mike S. Fulton, British Columbia (CA); Kishor V. Patil, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 13/559,908

(22) Filed: Jul. 27, 2012

(65) Prior Publication Data
US 2013/0086569 A1 Apr. 4, 2013

(30) Foreign Application Priority Data

Sep. 30, 2011 (CA) ..................................... 2753626

(51) Int. Cl.
*G06F 9/45* (2006.01)
*G06F 9/455* (2006.01)

(52) U.S. Cl.
CPC ............ *G06F 9/45516* (2013.01); *G06F 8/443* (2013.01); *G06F 8/4443* (2013.01)

(58) Field of Classification Search
CPC ............................... G06F 8/443; G06F 8/4434
USPC ........................................................ 717/158
See application file for complete search history.

(56) References Cited

U.S. PATENT DOCUMENTS

| | | | |
|---|---|---|---|
| 5,966,702 A * | 10/1999 | Fresko et al. .......................... 1/1 |
| 6,526,565 B1 * | 2/2003 | Nally .............................. 717/108 |
| 6,658,492 B1 | 12/2003 | Kawahara et al. |
| 6,862,729 B1 * | 3/2005 | Kuch et al. .................... 717/158 |
| 6,865,657 B1 | 3/2005 | Traversat et al. |
| 7,434,214 B2 | 10/2008 | Jamison |
| 7,555,748 B2 * | 6/2009 | Archambault et al. ....... 717/158 |
| 7,574,699 B1 * | 8/2009 | Simmons et al. ............. 717/136 |
| 8,661,422 B2 * | 2/2014 | Lethin et al. .................. 717/151 |
| 2008/0155521 A1 | 6/2008 | Uola |
| 2013/0111435 A1 * | 5/2013 | Rudwick, III ................ 717/108 |

OTHER PUBLICATIONS

IBM, "IBM SDK, Java Technology Edition, Version 7, zOS User Guide," 2011-14, last retrieved from http://download.boulder.ibm.com/ibmdl/pub/software/dw/jdk/docs/java7/zos/en/sdkandruntimeguide.zos.70_7.0.pdf on Dec. 9, 2014.*

(Continued)

*Primary Examiner* — Qing Chen
*Assistant Examiner* — Andrew M Lyons
(74) *Attorney, Agent, or Firm* — Yee & Associates, P.C.; Parashos Kalaitzis

(57) ABSTRACT

A computer-implemented process for creating a packed data object, the computer-implemented process comprising providing instrumentation to an enhanced runtime by an enhanced compiler for a computer executable program portion, detecting a special class in the computer executable program portion by the enhanced runtime, creating an internal representation of a packed data object header using the instrumentation, calculating a size of elements for a packed data object associated with the computer executable program portion, determining a type of packed data object using information in the packed data object header, and responsive to a determination that the type of packed data object is an on-heap packed data object, storing the packed data object header and associated packed data object data together for the packed data object in a memory heap.

20 Claims, 7 Drawing Sheets

(56) References Cited

OTHER PUBLICATIONS

Titzer, "Objects to Bits: Efficient Implementation of Object-Oriented Languages on Very Small Devices", A dissertation submitted in partial satisfaction of the requirements for the degree Doctor of Philosophy in Computer Science, University of California, Los Angeles, Published in 2007, 185 pages.

Chen et al., "Heap Compression for Memory-Constrained Java Environments", Proceeding OOPSLA '03 Proceedings of the 18th Annual ACM SIGPLAN Conference on Object-Oriented Programming, Systems, Languages and Applications ACM, New York, NY, Published in 2003, ISBN: 1-58113-712-5, pp. 282-301.

Chen et al., "Heap Compression for Memory-Constrained Java Environments", Newsletter—Proceedings of the OOPSLA '03 Conference, vol. 38, Issue 11, Nov. 2003, New York, NY, pp. 282-301.

\* cited by examiner

Annotation system
200

FIG. 6

| COBOL | C | Java Packed Data Object |
|---|---|---|
| Object05 CUSTOMER-INFO<br>    10 LAST-NAME PIC X(15).<br>    10 FIRST-NAME PIC X(8).<br>    10 SALARY PIC S9(7) COMP -3 | typedef struct _CustomerInfo {<br>    char lastName [15];<br>    char firstName [8];<br>    int salary;<br>} CustomerInfo | public struct CustomerInfo {<br>    Bytevalue [20] lastName;<br>    Bytevalue [30] firstName;<br>    int salary;<br>} |

602 — COBOL
604 — C
606 — Java Packed Data Object
600

US 9,021,455 B2

PACKED DATA OBJECTS

BACKGROUND

1. Technical Field

This disclosure relates generally to data structures used with programming language objects in a data processing system and more specifically to creating a packed data object defined in a program in the data processing system.

2. Description of the Related Art

Some programming languages provide nested structured value types, for example structs in C programming language and records in COBOL. Java types, however, are limited to primitives and object references. When an instance of an object is created using Java, memory is allocated for the object to contain all of the primitive fields plus all of the reference fields associated with the object. Primitive fields are allocated inline with the object. However, object reference fields are allocated as a reference to another allocated instance object. A prior attempt to overcome the limitation was only capable of use on objects that wrapped native data. The previous attempt was not capable of working on actual Java heap objects and thus presented a further limitation. Such objects were not entitled for the garbage collection process provided for use in the programming language. Accordingly for each object reference field, extra heap memory was needed for the reference as well as for the new object header, leading to increased heap fragmentation.

SUMMARY

According to one embodiment, a computer-implemented process for creating a packed data object provides instrumentation to an enhanced runtime by an enhanced compiler for a computer executable program portion detects a special class in the computer executable program portion by the enhanced runtime and creates an internal representation of a packed data object header using the instrumentation. The computer-implemented process calculates a size of elements for a packed data object associated with the computer executable program portion, determines a type of packed data object using information in the packed data object header and responsive to a determination that the type of packed data object is an on-heap packed data object, stores the packed data object header and associated packed data object data together for the packed data object in a memory heap.

According to another embodiment, a computer program product for creating a packed data object comprises a computer recordable-type media containing computer executable program code stored thereon. The computer executable program code comprises computer executable program code for providing instrumentation to an enhanced runtime by an enhanced compiler for a computer executable program portion, computer executable program code for detecting a special class in the computer executable program portion by the enhanced runtime, computer executable program code for creating an internal representation of a packed data object header using the instrumentation, computer executable program code for calculating a size of elements for a packed data object associated with the computer executable program portion, computer executable program code for determining a type of packed data object using information in the packed data object header, and computer executable program code responsive to a determination that the type of packed data object is an on-heap packed data object, for storing the packed data object header and associated packed data object data together for the packed data object in a memory heap.

According to another embodiment, an apparatus for creating a packed data object, comprises a communications fabric, a memory connected to the communications fabric, wherein the memory contains computer executable program code; a communications unit connected to the communications fabric, an input/output unit connected to the communications fabric, a display connected to the communications fabric and a processor unit connected to the communications fabric. The processor unit executes the computer executable program code to direct the apparatus to provide instrumentation to an enhanced runtime by an enhanced compiler for a computer executable program portion, detect a special class in the computer executable program portion by the enhanced runtime, create an internal representation of a packed data object header using the instrumentation, calculate a size of elements for a packed data object associated with the computer executable program portion, determine a type of packed data object using information in the packed data object header and responsive to a determination that the type of packed data object is an on-heap packed data object, store the packed data object header and associated packed data object data together for the packed data object in a memory heap.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 6 is a tabular representation of programming language data layout definitions compatible with a packed data object definition, in accordance with one embodiment of the disclosure.

DETAILED DESCRIPTION

Figure 1:
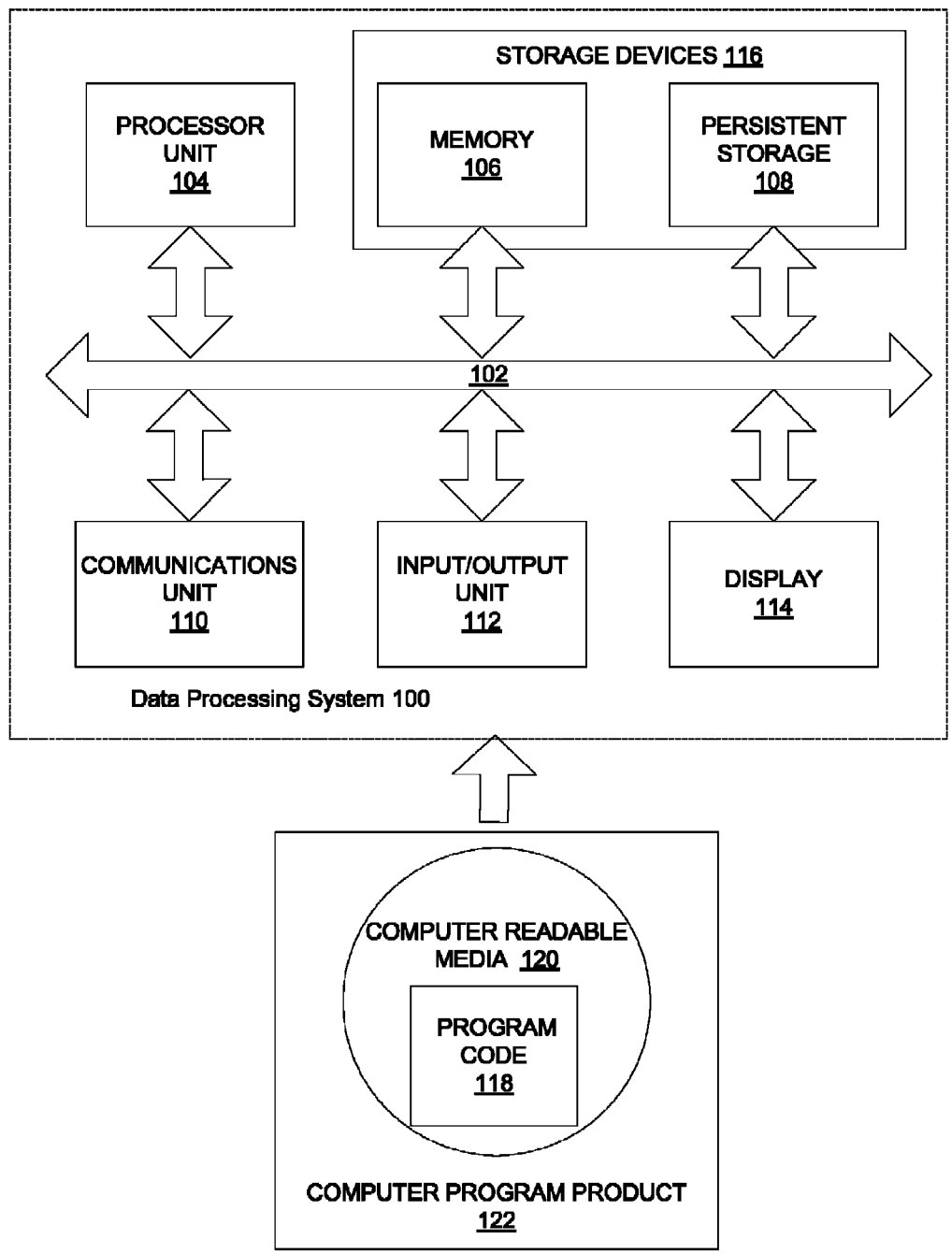
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for creating a packed data object by annotating a Java® program object to inline all of the fields of the object, including object reference fields, typically reducing a footprint of Java applications and reducing heap fragmentation. Using data processing system 100 of FIG. 1 as an example, an illustrative embodiment provides the computer-implemented process stored in memory 106, executed by processor unit 104, for creating packed data objects. Processor unit 104 provides instrumentation to an enhanced runtime using an enhanced compiler for a computer executable program portion. Processor unit 104 further detects a special class in the computer executable program portion using the enhanced runtime. Processor unit 104 creates an internal representation, in storage devices 116, typically in memory 106, of a packed data object header using the instrumentation. Processor unit 104 calculates a size of elements for a packed data object associated with the computer executable program portion and determines a type of packed data object using information in the packed data object header. Responsive to a determination that the type of packed data object is an on-heap packed data object, processor unit 104 stores the packed data object header and associated packed data object data together for the packed data object in a memory heap in memory 106.

In an alternative embodiment, program code 118 containing the computer-implemented process may be stored within computer readable media 120 as computer program product 122. In another illustrative embodiment, the process for packed data object creation may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process of packed data object creation.

Figure 2:
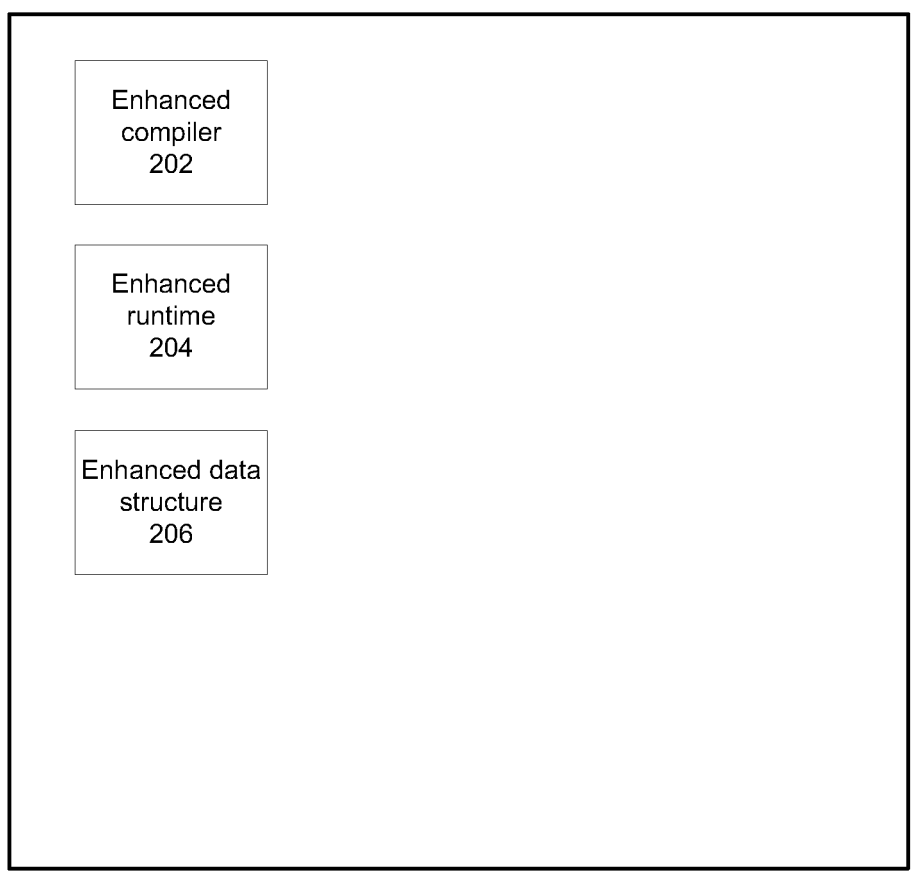
FIG. 2 is a block diagram of an annotation system, in accordance with various embodiments of the disclosure.

With reference to FIG. 2, a block diagram of an annotation system, in accordance with various embodiments of the disclosure is presented. Annotation system 200 is an example of a portion of a data processing system for creating packed data objects, such as data processing system 100 of FIG. 1, having the annotation system incorporated within.

Annotation system 200, in the illustrative embodiment, includes a number of elements, leveraging support of an underlying data processing system, comprising enhanced compiler 202, enhanced runtime 204 and enhanced data structure 206. Enhanced data structure 206 represents a set of data structures, including one or more packed data structures such as those created by an annotation process when using annotation system 200. The illustrative embodiment uses a Java programming language example, but the concepts presented are applicable to other object oriented programming languages as well.

Enhanced compiler 202 provides a capability to annotate a Java object enabling inlining of all respective fields, including object fields, thereby typically reducing a footprint of Java applications and reducing heap fragmentation. An object created using a process of enhanced compiler 202 is hereafter referred to as a packed object (or packed data object interchangeably) in the form of enhanced data structure 206.

Enhanced compiler 202 provides a capability to tightly pack object fields on the Java object itself to preserve heap memory while still fully supporting the garbage collection of such objects. The packed data object typically enables Java heap memory savings and considerable performance improvements with respect to data access.

The creation of a new object shape model in the form of enhanced data structure 206 by enhanced compiler 202 can be used on annotated objects to considerably reduce the object footprint. By creating a new object shape, and instrumenting the virtual machine provided as enhanced runtime 204, enables inlining of the fields of the object and tightly packing respective data to typically create Java objects as small as possible while improving interoperability of Java objects with other programming languages. Instrumenting the virtual machine, in the example, is performed by enhanced compiler 202 using keywords as tags or annotations presented to enhanced runtime 204.

Objects used in a data access layer (DAL) of an application are typically strong candidates for this new object shape model. The new object shape model created by enhanced compiler 202 typically comprise smaller and simpler objects enabling further memory heap savings on complex object graphs with reduced memory fragmentation and better data locality thereby providing faster data access. In addition, the new object shape model typically provides a capability for improved interoperability with other programming languages and systems while also enabling improvements within the Java class libraries internal data structures.

Figure 3:
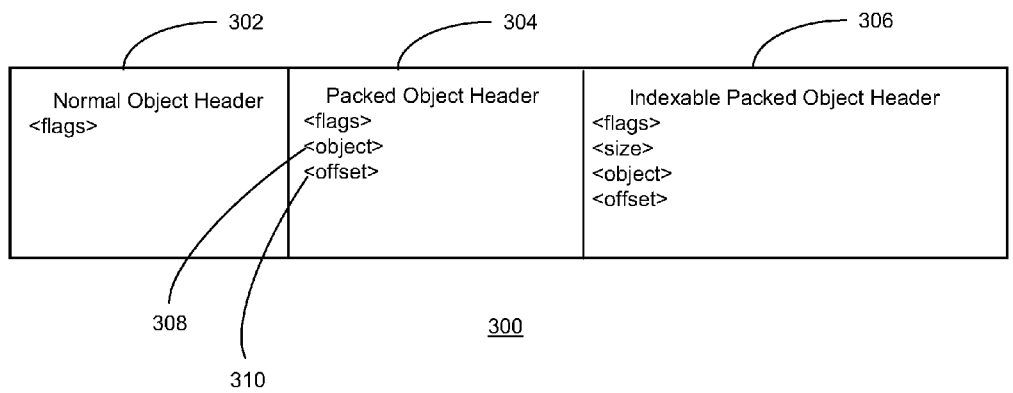
FIG. 3 is a tabular representation of packed data object header, in accordance with one embodiment of the disclosure.

With reference to FIG. 3, a tabular representation of packed data object header, in accordance with one embodiment of the disclosure, is presented. Table 300 is an example of a normal object header compared with a packed data object header used in enhanced data structure 206 of annotation system 200 of FIG. 2.

In the following example, packed classes and a virtual machine of embodiments of the disclosure are presented. Classes can take advantage of annotation system by using the struct keyword as in the following code snippet:

```
struct PackedPrimitives {
   public int i;
   public double d;
```

```
   public PackedBytes pb;
}
```

The struct keyword is a new keyword introduced to the Java programming language by which enhanced compiler 202 provides instrumentation to a virtual machine representative of enhanced runtime 204 (all of annotation system 200 of FIG. 2) providing a capability to detect such special class types. When the virtual machine first reads this special class from disk, the virtual machine detects that this class is marked (meaning tagged or annotated) as a packed class changing the internal representation from normal object header 302 to a packed data object header represented as header 304. Indexable packed object header 306 describes the shape of the packed data object using metadata to describe the object and contents. The fields of object 308 and offset 310 as well as metadata usage are described in a following portion of the disclosure.

The meaning of the new header fields is discussed later in this document. The virtual machine representative of enhanced runtime 204, at this point, sets internal bits that flag this class as a packed class for fast runtime detection. The read only memory (ROM) representation of the packed class is ready for use.

The java.lang.Class representation of the newly created packed class is created. To create the java.lang.Class representation, the enhanced virtual machine must consider differences in a total instance size as well as in the order and size of the object fields. Since packed objects inline respective data, the enhanced virtual machine walks all instance fields of the packed class to calculate a proper instance size. This is a standard practice for primitive fields, however a recursive approach is needed for packed data object fields. For example, using the following code snippet:

```
struct PackedPrimitives {
   public float f;
   public char c;
}
struct MyPackedObject {
   public int i;
   public double d;
   public PackedPrimitives pp;
}
```

To calculate an instance size of MyPackedObject, the enhanced virtual machine walks the first two instance fields (i and d) and obtains a respective size of each from their respective types. The size of the field pp however, requires a recursive call to find associated primitive fields (f and c). The packed version of MyPackedObject will accordingly have a following instance size computed as sizeof(int)+sizeof(double)+sizeof(float)+sizeof(char)=18 bytes.

The capability enables elimination of the allocation of an object reference for pp and an allocation of the object header for pp as well. Having completed the internal representation of a packed class, the enhanced virtual machine is ready to actually support the creation of packed objects.

Two types of packed objects can be created in the form of on-heap and off-heap packed objects of enhanced data structure 206 of annotation system 200 of FIG. 2. With on-heap packed objects, both the object header and the object data are stored together on the Java heap. With off-heap packed objects, only the object header is stored on the Java heap. The data for the object can be stored where desired, including native memory or a database.

The type of packed data object of enhanced data structure 206 of annotation system 200 of FIG. 2 is detected using two fields introduced earlier in the packed object header as object 308 and offset 310. A field, object 308, enables tracking the object when the garbage collection moves an on-heap packed object. When object 308 is 0 (zero) value, the object is an off-heap packed data object and the garbage collection will not reclaim off-heap objects because these objects are tied to native resources.

The field offset 310 enables resolution of packed fields, independent of a packed type. For an on-heap packed object, offset 310 is set to an offset value where the data starts within the object, which is the size of the header of the object. For an off-heap packed object, offset 310 is set to a value of a pointer on a resource (for example, native memory) where the data for the particular object data is located. The field offset 310 provides a very efficient way for a just-in-time compiler, such as enhanced compiler 202 of annotation system 200 of FIG. 2 to access the location of the object data at field resolution time.

An on-heap packed data object can be created using a new keyword in Java, while an off-heap packed data object can be created through a factory method, which also enables a user to associate the packed data object with an external data source.

When a packed data object is allocated, all data fields are allocated at the same time and are packed into a single object. Non-primitive data fields do not need to be explicitly initialized. There are no headers for sub packed data object fields because all object meta-data is percolated into a single header. The size of a packed data object is always statically known at compile time. Fields are not reordered by the enhanced virtual machine in the case of a packed object. The order of the fields remains unchanged to maintain affinity with that of the original data definition such as a COBOL data structure definition.

Figure 4:
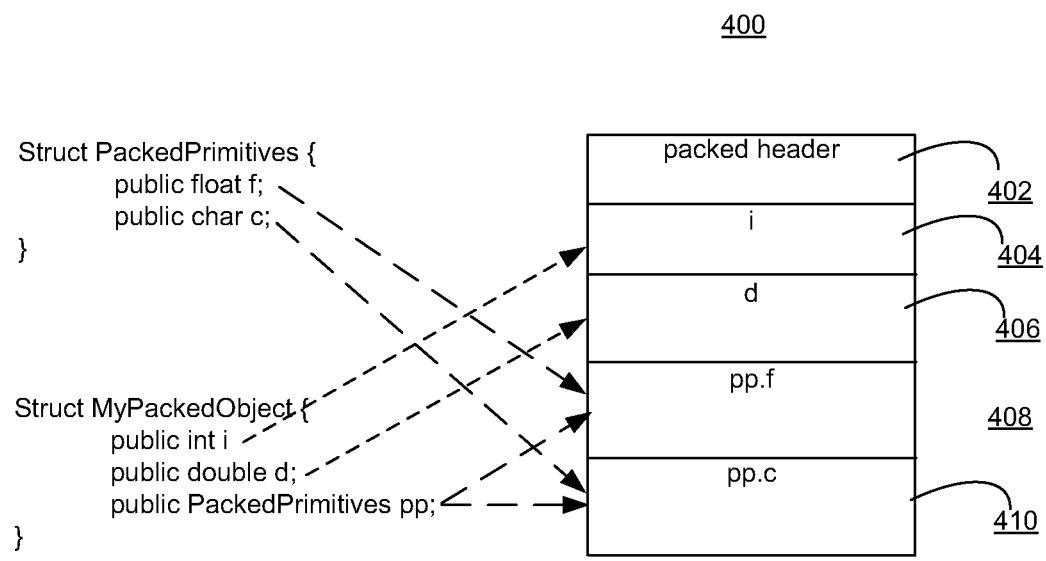
FIG. 4 is a tabular representation of an on-heap packed data object, in accordance with one embodiment of the disclosure.

With reference to FIG. 4, a tabular representation of an on-heap packed data object, in accordance with one embodiment of the disclosure, is presented. Table 400 is an example of an on-heap packed data object created using annotation system 200 of FIG. 2.

As in the previous example, a code snippet defining an on-heap allocated object is used.

```
struct PackedPrimitives {
public float f;
public char c;
}
struct MyPackedObject {
public int i;
public double d;
public PackedPrimitives pp;
}
```

A new packed data object in the form of MyPackedObject of table 400 comprises a header portion 402 with instance data for field i 404 and field d 406. Further allocations include element pp.f 408 and element pp.c 410 providing information representative of the packed primitives float and character portions of the packed data object.

Figure 5:
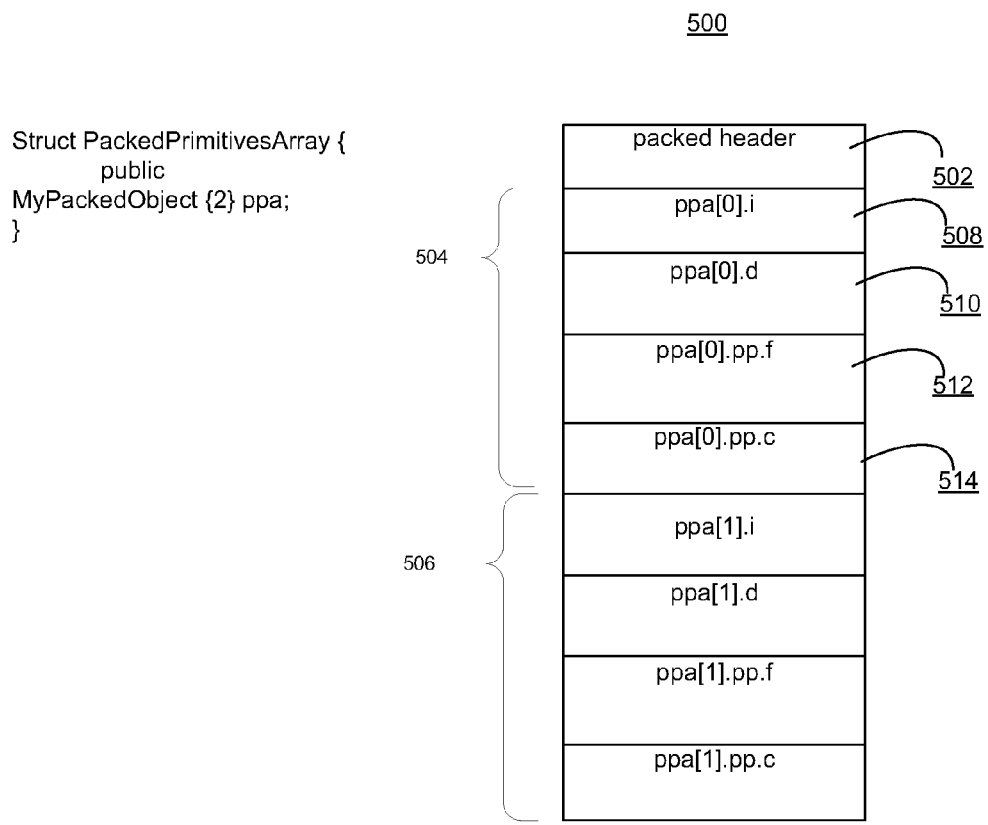
FIG. 5 is a tabular representation of an array portion of a packed data object, in accordance with one embodiment of the disclosure.

With reference to FIG. 5, a tabular representation of an array portion of a packed data object, in accordance with one embodiment of the disclosure, is presented. Table 500 is an example of an array component of a packed data object created using annotation system 200 of FIG. 2 as defined using indexable packed object header 306 describing the shape of the packed data object using metadata to describe the object and contents as in FIG. 3.

Arrays are also packed together to form a contiguous sequence of data fields. The array length is percolated up into the packed object header as illustrated in indexable packed object header 306 of FIG. 3. Accessing an element of a packed data array is still bounds checked as expected in normal Java programming.

The following code snippet is used to create an array in the form of a packed data object represented internally as PackedPrimitivesArray of table 500 associated with MyPackedObject.

```
struct PackedPrimitivesArray {
public MyPackedObject[2] ppa;
}
```

A set of new packed array elements in the form of PackedPrimitivesArray for MyPackedObject comprises a header portion 502 with a repeating series of sequence 504 and sequence 506 as needed to describe all array elements. Each series comprising respective elements of instance data for field ppa(0).i 508 and field ppa(0).d 510 with further allocations including element ppa(0).pp.f 512 and element ppa(0).pp.c 514 providing information representative of the packed primitives instance, float and character portions of the packed data object MyPackedObject. The sequence is repeated within the series as needed to describe all elements to complete the array.

The size of a packed array must be statically known at compile time. All elements of the array must be the same concrete type. Any fields of the packed class that are of array type must have a constant length. Each field of a packed class that is an array must be annotated with an @Length annotation to provide a static constant length, which may also enable optimization, such as, bounds check elimination. Fields in a packed class of primitive array type are not permitted, instead new wrapper types are provided for each primitive type. For example, IntValue must be used in place of int. The wrapper types are required to enable enhanced compiler 202 and enhanced runtime 204 of annotation system 200 of FIG. 2 to identify packed arrays by a respective type.

Packed arrays enable packed objects to not be required to have object headers, thereby typically reducing memory usage. All the data associated with the array is stored in contiguous memory locations, improving data locality and the memory is allocated in a single operation, drastically reducing heap fragmentation and improving allocation time. The allocated memory is thus enabled for direct mapping to arrays used by programming languages such as C, C++ and COBOL. An element of a packed array is not permitted to be a null value. No object graph navigation is required to access fields of nested objects.

Accessing the fields of a packed object uses normal Java syntax for field access. With normal Java objects, a field offset is calculated using the sum of <object data offset>+fieldOffset values. With a packed object, a field offset is calculated as a sum of <object>+<offset>+fieldOffset values. In contrast with usual Java objects, field access embodiments of the annotation system do not need to navigate an object graph for reference fields, instead using an enhanced data structure to specify an offset into the packed data object.

When accessing a nested packed object field, the Java language requires a reference to the object be created. For example, using the expression:

```
PackedPrimitives packedPrimitives = myPackedObject.pp; // reference
header created
someFunction(packedPrimitives);
```

The just-in-time compiler (JIT) can typically eliminate this footprint cost in most cases by performing escape analysis on the object and performing a stack allocation for the header whenever possible. To the user, these reference objects appear as reference objects in Java, and the shape is that of a packed object header. The creation of reference headers, in very specific cases, may therefore reduce the footprint gains created when using packed data objects. However, JIT support typically eliminates a majority of such cases enabling footprint gains to outweigh the cost of headers, which cannot be eliminated.

Assignment of packed objects, when using embodiments of the disclosed annotation system, is by-reference as with normal Java objects. However, assignments to a nested packed data object field is not allowed and generates a compiler error. For example when using the following code snippet:

```
struct PackedPrimitives {
public float f;
public char c;
}
struct MyPackedObject {
public int i;
public double d;
public PackedPrimitives pp;
}
MyPackedObject mpo = new MyPackedObject( );
mpo.pp = new PackedPrimitives( ); // compile error
PackedPrimitives newPP = new PackedPrimitives( );
mpo.pp = newPP; // compile error
```

In the previous example, since MyPackedObject is a packed data object, pp is not a reference object therefore the =operator cannot be used. The constraint maintains the typical Java semantics of copy-by-reference. Copy-by-value should be made explicit, either through a call to a method, or by using a new copy assignment operator (for example, using <) defined in the context of packed data objects as in the following example code snippet:

```
MyPackedObject mpo = new MyPackedObject( );
PackedPrimitives newPP = new PackedPrimitives( );
mpo.pp < newPP; // copies values of newPP into mpo.pp
```

Fields to copy are determined by the type property of the left-hand-side expression. When the right-hand-side of the expression comprises a sub-type of the left-hand-side of the expression only fields associated with the left-hand-side of the expression are copied. The copy operation using the packed data object is also more optimal than normal Java field copying because the data is packed together, enabling a single memory copy operation.

Using embodiments of the annotation system enables packed data objects to be mapped directly to data declared in other programming languages such as COBOL. This capability enables creating a packed data object in which data fields are located outside the Java heap (off-heap packed data object). The off-heap packed data object capability enables native memory access from Java programs in a natural and efficient way using direct field access. For example, using the off-heap packed data object capability of the annotation system enables allocation of data in a C or COBOL program, and manipulation of that data directly in a Java program by creating a packed data object pointing to the data in native memory. When differences in data layout exist using different programming languages, a Java packed data object representation that matches a particular format can be created.

With reference to FIG. 6, a tabular representation of programming language data layout definitions compatible with a packed data object definition, in accordance with one embodiment of the disclosure, is presented. Table 600 is an example of corresponding data layout definitions for a COBOL, C and packed data object definition (created using annotation system 200 of FIG. 2).

Table 600 comprises a header row containing column labels representing COBOL 602, C 604 and Java Packed Object 606 definitions. COBOL 602 refers to a column of data representing fields in a customer info record. C 604 refers to a column of data representing contents of a data structure containing the same customer information as COBOL 602, in accordance with the C program language conventions. Java Packed Object 606 refers to a column of data representing contents of a data structure containing the same customer information as COBOL, and the C program language conventions however now in accordance with the annotation system definitions.

In the examples provided the same sequence of fields of information is presented across the columns. The order of fields, as previously stated, does not change when using embodiments of the annotation system definitions. Annotation system definitions may be used to provide typically more efficient access to data returned by a database query. For example, Java database connectivity (JDBC) drivers may use packed data objects to more efficiently access data returned by a query. In another example, improved interoperability with COBOL may be achieved using embodiments of the annotation system. Enterprises modernizing development practices by writing new applications in Java need to share data between COBOL and Java applications, but the sharing is typically not efficient. Use of embodiments of the annotation system may resolve the sharing difficulties. In another example, improved interoperability with existing libraries written in C or C++ may be achieved using embodiments of the annotation system. Still further, some of the data structures in the Java class library could be re-implemented using packed data objects enable more memory efficiency.

Figure 7:
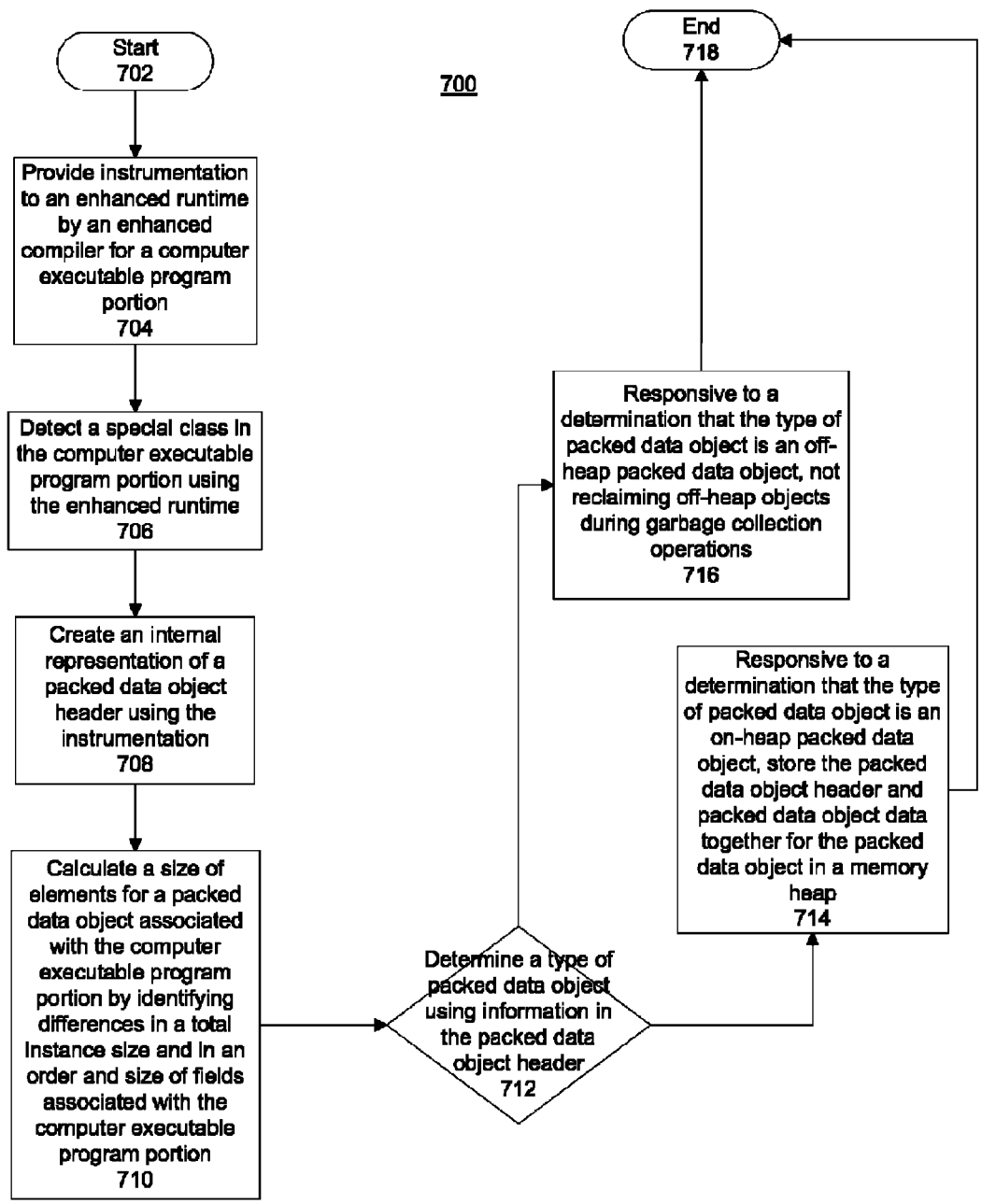
FIG. 7 is a process for creating a packed data object, using the annotation system of FIG. 2, in accordance with one embodiment of the disclosure.

With reference to FIG. 7, a process for creating a packed data object, using the annotation system of FIG. 2, in accordance with one embodiment of the disclosure is presented. Process 700 is an example of process for creating packed data objects using annotation system 200 of FIG. 2.

Process 700 begins (step 702) and provides instrumentation to an enhanced runtime by an enhanced compiler for a computer executable program portion (step 704). Providing instrumentation further comprises annotating the computer executable program portion, wherein an annotation comprises a set of one or more keywords usable in a keyword aware component of the enhanced runtime. For example, a keyword structs is used to inform the enhanced runtime of a special class of program.

Process 700 detects a special class in the computer executable program portion using the enhanced runtime (step 706). Detecting a special class in the computer executable program portion by the enhanced runtime further comprises receiving the computer executable program portion instrumented by the enhanced compiler, changing an internal representation of a normal object header to the internal representation of the packed data object header and flagging the computer executable program portion for fast data access. In an alternative embodiment, changing an internal representation of a normal object header to the internal representation of the packed data object header may be replaced by directly using an internal representation of the packed data object header known to the enhanced compiler and enhanced runtime.

Process 700 creates an internal representation of a packed data object header using the instrumentation (step 708). Process 700 calculates a size of elements for a packed data object associated with the computer executable program portion by identifying differences in a total instance size and in an order and size of fields associated with the computer executable program portion (step 710). Process 700 further traverses all instance fields to calculate an instance size using a type associated with each field and recursively calls each packed field to obtain an associated primitive field and sums a value of each type to create the size of elements.

Process 700 determines a type of packed data object using information in the packed data object header (step 712). Process 700 determines whether the type is indicative of one of the on-heap packed data object and an off-heap packed data object using values contained in fields representing an object field and an offset field in the packed data object header.

Responsive to a determination that the type of packed data object is an on-heap packed data object, process 700 stores the packed data object header and the associated packed data object data together for the packed data object in a memory heap (step 714) and terminates thereafter (step 718). Responsive to a determination that the type of packed data object is an off-heap packed data object, not reclaiming off-heap objects during garbage collection operations (step 716) and terminates thereafter (step 718).

Process 700 may optionally be extended to access fields in the packed data object thus created using normal field access, wherein the field access is calculated as a sum of values of object and offset and field offset, wherein the field access specifies an offset into the packed data object.

Thus in one illustrative embodiment, a computer-implemented process creates a packed data object. The computer-implemented process provides instrumentation to an enhanced runtime by an enhanced compiler for a computer executable program portion, detects a special class in the computer executable program portion by the enhanced runtime and creates an internal representation of a packed data object header using the instrumentation. The computer-implemented process calculates a size of elements for a packed data object associated with the computer executable program portion, determines a type of packed data object using information in the packed data object header and responsive to a determination that the type of packed data object is an on-heap packed data object, stores the packed data object header and associated packed data object data together for the packed data object in a memory heap.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for creating a packed data object, the computer-implemented process comprising:
providing instrumentation to an enhanced runtime by an enhanced compiler for a computer executable program portion;
detecting a special class in the computer executable program portion by the enhanced runtime;
creating an internal representation of a packed data object header using the instrumentation;
calculating a size of elements for a packed data object associated with the computer executable program portion;
determining a type of packed data object using information in the packed data object header; and
responsive to a determination that the type of packed data object is an on-heap packed data object, storing the packed data object header and associated packed data object data together for the packed data object in a memory heap.

2. The computer-implemented process of claim 1, wherein providing instrumentation further comprises:
annotating the computer executable program portion, wherein an annotation comprises a set of one or more keywords usable in a keyword aware component of the enhanced runtime.

3. The computer-implemented process of claim 1, wherein detecting a special class in the computer executable program portion by the enhanced runtime further comprises:
receiving the computer executable program portion instrumented by the enhanced compiler;
changing an internal representation of a normal object header to the internal representation of the packed data object header; and
flagging the computer executable program portion for fast data access.

4. The computer-implemented process of claim 1, wherein calculating a size of elements for a packed data object associated with the computer executable program portion further comprises:
identifying differences in a total instance size and in an order and size of fields associated with the computer executable program portion;
walking all instance fields to calculate an instance size using a type associated with each field;
recursively calling each packed filed to obtain an associated primitive field; and
summing a value of each type to create the size of elements.

5. The computer-implemented process of claim 1, wherein determining a type of packed data object using information in the packed data object header further comprises:
determining whether the type is indicative of one of the on-heap packed data object and an off-heap packed data object using values contained in fields representing an object field and an offset field in the packed data object header.

6. The computer-implemented process of claim 1, wherein responsive to a determination that the type of packed data object is an off-heap packed data object, not reclaiming off-heap objects during garbage collection operations.

7. The computer-implemented process of claim 1, further comprising:
accessing fields in the packed data object using normal field access, wherein the field access is calculated as a sum of values of object and offset and field offset, wherein the field access specifies an offset into the packed data object.

8. A computer program product for creating a packed data object, the computer program product comprising:
a non-transitory computer recordable-type media containing computer executable program code stored thereon, the computer executable program code comprising:
computer executable program code for providing instrumentation to an enhanced runtime by an enhanced compiler for a computer executable program portion;
computer executable program code for detecting a special class In the computer executable program portion by the enhanced runtime;
computer executable program code for creating an internal representation of a packed data object header using the instrumentation;
computer executable program code for calculating a size of elements for a packed data object associated with the computer executable program portion;
computer executable program code for determining a type of packed data object using information in the packed data object header; and
computer executable program code, responsive to a determination that the type of packed data object is an on-heap packed data object, for storing the packed data object header and associated packed data object data together for the packed data object in a memory heap.

9. The computer program product of claim 8, wherein computer executable program code for providing instrumentation further comprises:
computer executable program code for annotating the computer executable program portion, wherein an annotation comprises a set of one or more keywords usable in a keyword aware component of the enhanced runtime.

10. The computer program product of claim 8, wherein computer executable program code for detecting a special class in the computer executable program portion by the enhanced runtime further comprises:
computer executable program code for receiving the computer executable program portion instrumented by the enhanced compiler;
computer executable program code for changing an internal representation of a normal object header to the internal representation of the packed data object header; and
computer executable program code for flagging the computer executable program portion for fast data access.

11. The computer program product of claim 8, wherein computer executable program code for calculating a size of elements for a packed data object associated with the computer executable program portion further comprises:
computer executable program code for identifying differences in a total instance size and in an order and size of fields associated with the computer executable program portion;
computer executable program code for walking all instance fields to calculate an instance size using a type associated with each field;
computer executable program code for recursively calling each packed filed to obtain an associated primitive field; and computer executable program code for summing a value of each type to create the size of elements.

12. The computer program product of claim 8, wherein computer executable program code for determining a type of packed data object using information in the packed data object header further comprises:

computer executable program code for determining whether the type is indicative of one of the on-heap packed data object and an off-heap packed data object using values contained in fields representing an object field and an offset field in the packed data object header.

13. The computer program product of claim 8, wherein computer executable program code responsive to a determination that the type of packed data object is an off-heap packed data object, further comprises computer executable program code for not reclaiming off-heap objects during garbage collection operations.

14. The computer program product of claim 8, further comprising:

computer executable program code for accessing fields in the packed data object using normal field access, wherein the field access is calculated as a sum of values of object and offset and field offset, wherein the field access specifies an offset into the packed data object.

15. An apparatus for creating a packed data object, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

provide instrumentation to an enhanced runtime by an enhanced compiler for a computer executable program portion;

detect a special class III the computer executable program portion by the enhanced runtime;

create an internal representation of a packed data object header using the instrumentation;

calculate a size of elements for a packed data object associated with the computer executable program portion;

determine a type of packed data object using information III the packed data object header; and responsive to a determination that the type of packed data object is an on-heap packed data object, store the packed data object header and associated packed data object data together for the packed data object in a memory heap.

16. The apparatus of claim 15, wherein the processor unit executes the computer executable program code to provide instrumentation further directs the apparatus to:

annotate the computer executable program portion, wherein an annotation comprises a set of one or more keywords usable in a keyword aware component of the enhanced runtime.

17. The apparatus of claim 15, wherein the processor unit executes the computer executable program code to detect a special class in the computer executable program portion by the enhanced runtime further directs the apparatus to:

receive the computer executable program portion instrumented by the enhanced compiler;

change an internal representation of a normal object header to the internal representation of the packed data object header; and flag the computer executable program portion for fast data access.

18. The apparatus of claim 15, wherein the processor unit executes the computer executable program code to calculate a size of elements for a packed data object associated with the computer executable program portion further directs the apparatus to:

identify differences in a total instance size and in an order and size of fields associated with the computer executable program portion;

walk all instance fields to calculate an instance size using a type associated with each field;

recursively call each packed filed to obtain an associated primitive field; and sum a value of each type to create the size of elements.

19. The apparatus of claim 15, wherein the processor unit executes the computer executable program code to determine a type of packed data object using information in the packed data object header further directs the apparatus to:

determine whether the type is indicative of one of the on-heap packed data object and an off-heap packed data object using values contained in fields representing an object field and an offset field in the packed data object header; and responsive to a determination that the type of packed data object is an off-heap packed data object, not reclaiming off-heap objects during garbage collection operations.

20. The apparatus of claim 15, wherein the processor unit executes the computer executable program code to further direct the apparatus to:

access fields in the packed data object using normal field access, wherein the field access is calculated as a sum of values of object and offset and field offset, wherein the field access specifies an offset into the packed data object.

* * * * *